//

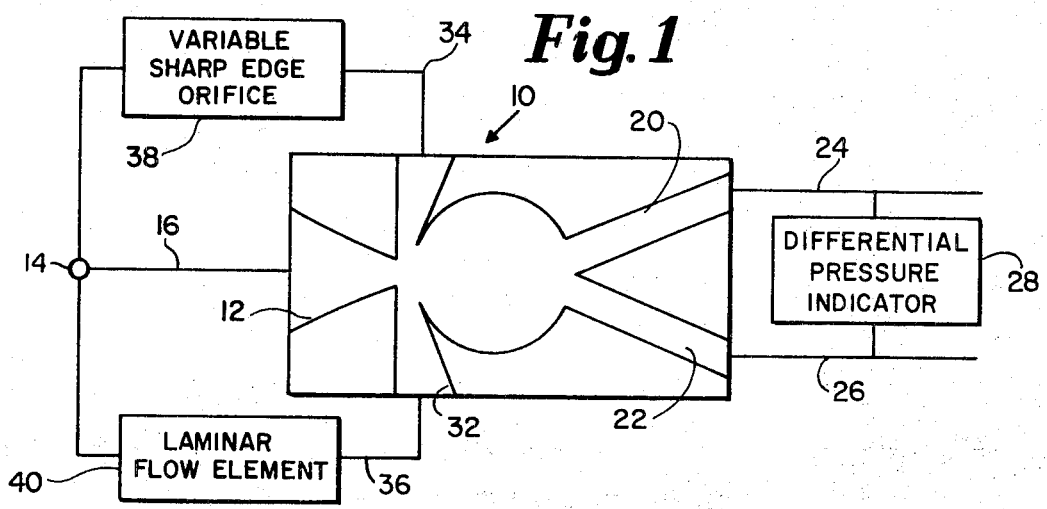
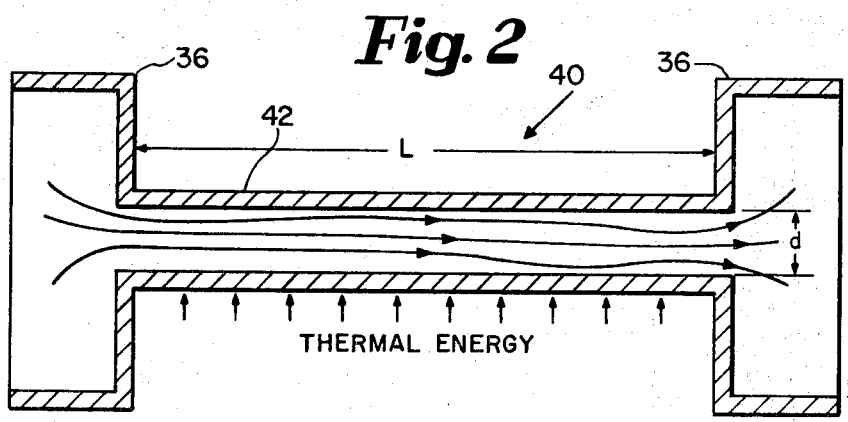
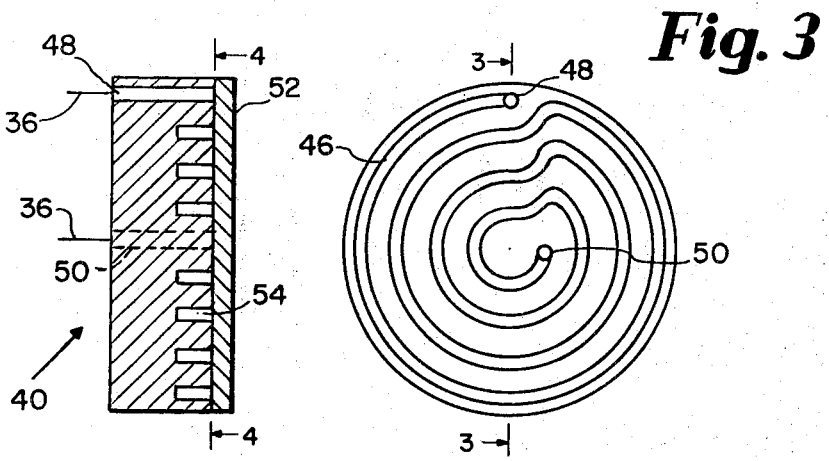
INVENTOR.
RALPH G. ZAGINAILOFF
ROGER M. BABCOCK

United States Patent Office 3,533,290
Patented Oct. 13, 1970

3,533,290
FLUIDIC TEMPERATURE SENSOR
Roger M. Babcock, Wakefield, and Ralph G. Zaginailoff, Beverly, Mass., assignors to Avco Corporation, Cincinnati, Ohio, a corporation of Delaware
Filed Mar. 13, 1969, Ser. No. 806,833
Int. Cl. G01k 11/00
U.S. Cl. 73—357                                 Claims 3

ABSTRACT OF THE DISCLOSURE

The disclosure illustrates a fluidic temperature sensor that uses a proportional fluid amplifier with a laminar flow element in series with one control jet and a variable sharp-edged orifice element in series with the other control jet for the amplifier. The laminar flow element is exposed to thermal energy and is highly conductive so that the flow through the laminar flow element and the resultant output of the proportional amplifier is proportional to the temperature level to which the laminar flow element is exposed.

---

The present invention relates to fluidic devices and more specifically to devices of this type that are responsive to temperature.

In the past it has been the practice to measure temperature with fluidic temperature-sensitive oscillators. These devices are generally effective in providing an indication of temperature. However, they require additional flow circuits to detect, discriminate and condition the oscillator signal to a usable form. These additional components add to the complication of the device and require a substantial amount of fluid flow.

Accordingly, it is an object of the present invention to provide a highly effective, economical, compact and simplified temperature-sensitive fluidic device.

The above ends are achieved in one aspect of the present invention by a fluidic device which comprises a means for discharging a power stream and a means for discharging a control stream against the power stream. The control stream acts to deflect the power stream proportional to the flow of the control stream and a means for receiving the power stream provides a pressure output responsive to the degree of deflection of the power stream. A laminar flow element is series connected with the control stream discharge means and is exposed to exterior thermal energy. The laminar flow element is adapted to convert the energy into heat transmitted to the control stream to vary the flow of fluid through the element proportional to the level of the exterior thermal energy. As a result, the fluid flow through the element and the pressure output of the fluidic device is responsive to the level of the exterior thermal energy.

It is a further and more specific object of the present invention to provide a laminar flow element for the above fluidic device which maximizes the effect of the exterior thermal energy on the fluidic device.

This object is achieved by a laminar flow element for the above fluidic device comprising a cylindrical base of insulating material having a groove in one face thereof to form a spiral path. The base has inlet and outlet ports extending from opposite ends of the spiral groove to the opposite face of the base for connection with the control stream flow path of the temperature-responsive fluidic device. A relatively thin, highly thermally conductive sheet of material covers the face of the base on which the grooves are formed, thereby forming a spiral passageway on one side of the base. The thermally conductive sheet is exposed to the exterior thermal energy and the flow area and length of the spiral passageway is of sufficient magnitude to enable laminar flow therethrough for the flow conditions experienced in the fluidic device.

The above and other related objects and features of the invention will be apparent from a reading of the following description of the disclosure found in the accompanying drawings and the novelty thereof pointed out in the appended claims.

In the drawing:

FIG. 1 is a diagrammatic view of a fluidic temperature-sensing device embodying the present invention;

FIG. 2 is an enlarged view of a laminar flow element used in the fluidic device of FIG. 1;

FIG. 3 is a longitudinal section view of a preferred form of laminar flow element for use with the fluidic temperature-sensing device of FIG. 1; and FIG. 4 is a view taken on lines 4—4 of FIG. 3.

Referring particularly to FIG. 1, there is shown a temperature-sensing device including a proportional fluidic amplifier, generally indicated by reference character 10. The proportional amplifier 10 comprises a port 12 for receiving pressurized fluid from a suitable source 14 via supply conduit 16 and discharging the fluid in the form of a power stream into a chamber 18. A pair of receiver ports 20, 22 are positioned at the opposite end of chamber 18 so that when the power stream from port 12 is in an undeflected state it will impinge equally on ports 20, 22. Ports 20, 22 are connected in suitable fashion, via conduits 24, 26, to a low pressure discharge point. A differential pressure indicator 28 is connected to the conduits 24, 26 and provides an output proportional to the pressure in the receiver ports 20, 22. The power stream discharged from port 12 is deflected by a pair of oppositely positioned control ports 30, 32. These ports receive control fluid from the source of pressurized fluid 14 via conduits 34, 36, respectively. A variable sharp-edged orifice 38 is interposed in conduit 34. A laminar flow element 40 is interposed in conduit 36 and exposed to a source of thermal energy. The sharp-edged orifice also may be exposed to the source of exterior thermal energy as described later.

Attention is now directed to FIG. 2 which shows in greatly enlarged fashion a laminar flow element which can be used with the fluidic device shown in FIG. 1. The laminar flow element 40 comprises an elongated tube 42 interposed in conduit 36. The tube 42 has a diameter "$d$" and a length "$l$" sufficient to maintain laminar flow through the tube 42 for the pressure and flow conditions normally expected in the fluidic device of FIG. 1. The tube 42 is formed from material which has a high thermal conductivity to maximize the heat input to the fluid flowing through the tube 42.

In operation, a gas may be used as the source of pressurized fluid. For this case the mass flow through the laminar flow element will vary directly as a function of the density of the gas within the tube and inversely as a function of the gas viscosity. Since the density of a gas at a fixed pressure varies inversely as the absolute temperature and the viscosity varies directly as the square root of absolute temperature, the resultant flow through the laminar flow element 40 will vary approximately inversely as the 1.5th power of the absolute temperature of the gas. This, of course, assumes that the flow area of the tube length "$l$" and the differential pressure across the tube are held constant.

As a result, the flow from control port 32 varies in response to the temperature applied to the fluid flowing through laminar flow element 40. This variation of flow causes a deflection of the power stream emanating from port 12 which in turn causes a differential pressure across the receiver ports 20, 22. The resultant differential pressure is therefore proportional to the amount of thermal energy applied to the laminar flow element 40. It is possible, then, to calibrate the differential pressure-sensing device 28 to provide an output in terms of the temperature to which the laminar flow element is exposed.

In order to provide a null-type reading and to balance out the effect of gas density on the deflection of the fluid amplifier power stream, a sharp-edged orifice is used in the conduit 34 leading to the opposite control port 30. This sharp-edged orifice serves to adjust the flow from the port 30 to achieve an undeflected power stream position for given values of thermal energy. This arrangement would be particularly advantageous in a situation where it is desired to use the amplifier pressure output to control a device to a given level of temperature.

If the sharp-edge orifice 38 is exposed to widely varying ambient temperatures, the orifice 38 also may be exposed to the source of thermal energy. When this is done the variations in flow through the orifice 38, as a result of changes in density of the fluid, is similar to the density-caused variations in flow through the laminar flow element 40. As a result, errors are eliminated that would be due to uncontrolled density changes in orifice 38. At the same time the sensitivity of the device to temperature changes is reduced. However, the sensitivity reduction is insignificant when compared to the increase in accuracy of the device in a widely changing environment.

While the laminar flow element described in FIG. 2 is suitable for use with the fluidic device of FIG. 1, the element 40' (shown in FIGS. 3 and 4) is preferably used to achieve a maximum response to thermal energy. This fluidic device 40' comprises a cylindrical base element 44 of thermally insulating material. A groove 46 is formed in one face thereof in a spiral pattern, as indicated in FIG. 4. Ports 48, 50, respectively, extend from opposite ends of the groove 46 through the base 44 for connection with the conduit 36. A relatively thin sheet of material 52 having a high thermal conductivity is secured over the space of base 44 in which the groove 46 is formed. A spiral passageway thus is formed and its flow area and length are selected to insure laminar flow for the operating conditions of the amplifier. The material 52 may take the form of silver, copper, aluminum or other highly thermally conductive material.

It should be noted that the laminar flow element 40 produces a maximum heat transfer from the exterior source of thermal energy to the fluid flowing through the spiral passageway 54. This maximizes the response of the fluidic device to thermal energy and enables a more compact size for the device since the laminar flow path is in a relatively small space.

Having described the invention, what is claimed as novel and desired to be secured by Letters Patent of the United States is:

1. A fluidic device for indicating exterior thermal energy, said device comprising:
   means for discharging a power stream;
   means for discharging a control stream against said power stream, thereby to deflect said power stream proportional to the flow of said control stream, said control stream discharge means comprising a pair of discharge ports directed toward opposite sides of said power stream and means for providing first and second flow paths from a source of pressurized fluid to said respective discharge ports;
   a pair of receiver ports, said receiver ports being positioned to provide a pressure output responsive to the degree of deflection of said power stream;
   a laminar flow element, series connected in said first flow path means, said laminar flow element being exposed to said exterior thermal energy and adapted to convert said energy into heat transmitted to said control stream for varying the flow of fluid through said element proportional to the level of exterior thermal energy;
   a sharp-edged variable orifice interposed in said second flow path and adjustable to regulate the fluid flow therethrough for a zero pressure differential output from said fluidic device at a given level of thermal energy, said sharp-edged variable orifice being exposed to exterior thermal energy for minimizing effects of a widely varying temperature environment for said device;
   whereby fluid flow through said element and the pressure output of said fluidic device is responsive to the level of said exterior thermal energy.

2. A fluidic device as in claim 1 wherein said fluidic device is responsive to exterior thermal energy and wherein said laminar flow element comprises:
   an elongated tube having a flow area and length sufficient to maintain laminar flow therethrough for the fluid flow conditions in said fluidic device, said laminar flow element having a relatively high thermal conductivity for maximizing the response of said fluidic device to thermal energy.

3. A fluidic device as in claim 2 adapted to indicate thermal energy and wherein said laminar flow element comprises:
   a cylindrical base of insulating material having a groove in one face thereof to form a spiral path, said base having inlet and outlet ports extending from opposite ends of said spiral groove to the opposite face of said base for connection with said control stream flow path;
   a relatively thin, highly thermally conductive sheet of material covering the face of said base on which the grooves are formed, thereby forming a spiral passageway on one side of said base, the flow area and length of said spiral passageway being of sufficient magnitude to enable laminar flow for the flow conditions experienced in said fluidic device.

References Cited

UNITED STATES PATENTS

| 3,083,574 | 4/1963 | Messerly | 73—357 |
| 3,314,294 | 4/1967 | Colston | 73—357 |
| 3,383,919 | 5/1968 | Marcy et al. | 73—357 |

LOUIS R. PRINCE, Primary Examiner

F. SHOON, Assistant Examiner